United States Patent [19]

Beacom

[11] Patent Number: 4,538,822
[45] Date of Patent: Sep. 3, 1985

[54] SEAL GASKET SPECIFICALLY CONFIGURED TO SEAL THE JOINT BETWEEN ADJACENT OVAL CONCRETE PIPES

[76] Inventor: Roger R. Beacom, P.O. Box 296, Venice, Fla. 33595

[21] Appl. No.: 588,734

[22] Filed: Mar. 12, 1984

[51] Int. Cl.³ .............................................. F16J 15/12
[52] U.S. Cl. ................................................ 277/207 A
[58] Field of Search ....................... 277/207 A–207 R

[56] References Cited

U.S. PATENT DOCUMENTS

| | | | |
|---|---|---|---|
| 3,015,510 | 1/1962 | Bates | 277/207 A |
| 3,016,722 | 1/1962 | Batdorf | 277/207 A |
| 4,410,185 | 10/1983 | Sporre | 277/207 A |

OTHER PUBLICATIONS

O-Rings Solve Design Problems, Product Engineering Mail, 1960, 2 pages.

Primary Examiner—Robert I. Smith
Attorney, Agent, or Firm—A. W. Fisher, III

[57] ABSTRACT

A seal gasket specifically configured to seal the joint between adjacent oval concrete pipes, each oval concrete pipe having a male and female joint member formed on opposite ends thereof to operatively engage the corresponding joint member formed on the next adjacent oval concrete pipe, the seal gasket comprising an annular substantially resilient member including a base member disposed to engage the male joint member having a retainer element extending inwardly from the inner surface thereof to engage the inner end of the male joint member and a plurality of sealing elements extending outwardly from the outer surface of the base member to engage the female joint member such that as adjacent oval concrete pipes are placed in operative relation relative to each other the retainer element retains the seal gasket therebetween as the plurality of sealing elements are compressed therebetween to seal the joint between the adjacent oval concrete pipes.

2 Claims, 2 Drawing Figures

FIG. 1
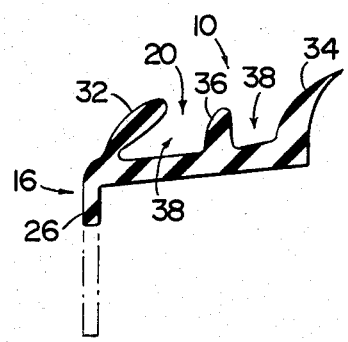
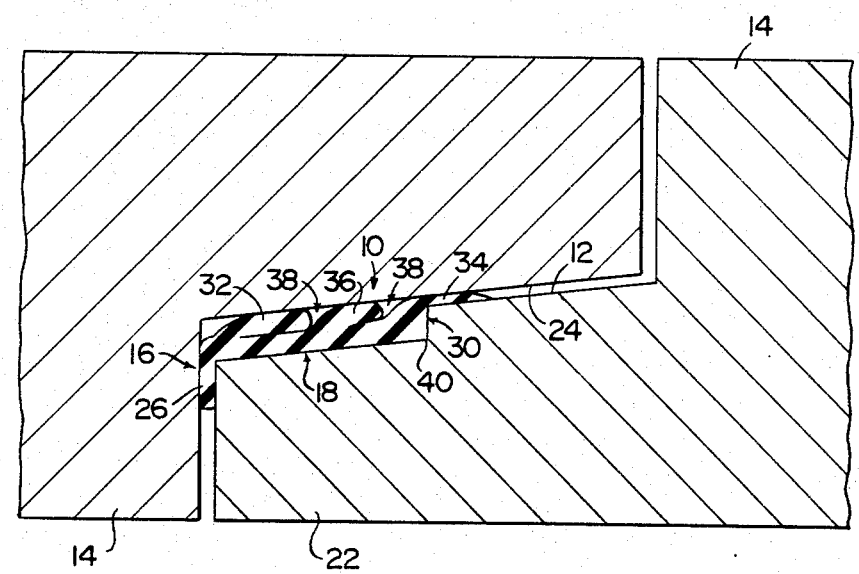
FIG. 2

4,538,822

SEAL GASKET SPECIFICALLY CONFIGURED TO SEAL THE JOINT BETWEEN ADJACENT OVAL CONCRETE PIPES

BACKGROUND OF THE INVENTION

1. 1 Field of the Invention

A seal gasket specifically configured to seal the joint between adjacent oval concrete pipes.

2. Description of the Prior Art

Numerous efforts have been made to provide a pipe connection comprising a penetrating pipe and a receiving pipe. Various retaining rings or sealing rings are employed which extend into the inner side of the receiving pipe ending a short distance from the free end of the pipe wherein the diameter of the retaining ring being substantially equal to the inner diameter of the receiving pipe.

Typically, pipes used to carry or transport large volumes of water or other fluid include an enlarged bell end to receive the next adjacent round pipe. However the terrain and water table in some areas does not permit use of round pipes with enlarged bell joints for sufficient volumes of water or other fluid to be transported. Thus oval pipes with symmetrical outer periphery have been developed. Unfortunately alignment and fitting of such oval pipes is relatively difficult.

Examples of the prior art are found in: U.S. Pat. Nos. 2,809,853; 2,832,614; 3,315,971; 3,414,273; 3,573,871; 3,575,430; 3,656,771; 3,520,541; 3,515,396; 3,675,685; 3,857,589; 4,084 828; 4,174,859; 4,279,425; together with Germany No. 2,402,022 and Great Britain No. 1,080,816.

SUMMARY OF THE INVENTION

The present invention relates to a seal gasket specifically configured to seal the joint between adjacent oval concrete pipes comprising a resilient member including a retainer element, base member and plurality of sealing elements. Each oval concrete pipe includes a male and female joint member formed on opposite ends thereof to operatively engage the corresponding joint member formed on the next adjacent oval concrete pipe.

The base member comprises a substantially flat compressible element disposed to engage the male joint member.

The retainer element comprises a retainer member extending inwardly from the inner surface of the base member to engage the inner end of the male joint member. When in place the engagement with the male joint member prevents the seal gasket from slipping into the joint or groove between the adjacent oval concrete pipes.

The plurality of sealing elements comprises an inner and outer compressible sealing elements formed on opposite ends of the base member having an intermediate sealing element disposed therebetween extending outwardly from the surface of the base member.

In operation the sealing gasket is placed in operative relation to one of the adjacent oval concrete pipes such that the retainer element engages the male joint member of one of the adjacent oval concrete pipes. Then the second adjacent oval concrete pipe is moved in coaxial relationship relative to the first adjacent oval concrete pipe to initially start the formation of the joint. As the two adjacent oval concrete pipes are moved inwardly or together relative to each other, the plurality of compressible sealing elements are compressed between the joint.

The invention accordingly comprises the features of contruction, combination of elements, and arrangement of parts that will be exemplified in the construction hereinafter set forth, and the scope of the invention will be indicated in the claims.

DESCRIPTION OF THE DRAWINGS

For a fuller understanding of the nature and objects of the invention, reference should be had to the following detailed description taken in connection with the accompanying drawings in which:

FIG. 1 is a side view of the seal gasket in the uncompressible state.

FIG. 2 is a side view of the seal gasket in the compressible state.

Similar reference characters refer to similar parts throughout the several views of the drawings.

DETAILED DESCRIPTON OF THE PREFERRED EMBODIMENT

As shown in FIGS. 1 and 2, the present invention relates to a seal gasket generally indicated as 10 specifically configured to seal the joint 12 between adjacent oval concrete pipes 14 or the like. More specifically, the seal gasket 10 comprises a resilient member including a retainer element, a base member and a plurality of sealing elements generally indicated as 16, 18 and 20 respectively. Each oval concrete pipe 14 includes a male and female joint member generally indicated as 22 and 24 respectively formed on opposite ends thereof to operatively engage the corresponding joint member 22 or 24 formed on the next adjacent oval concrete pipes 14.

The retainer element 16 comprises an annular retainer member 26 configured to engage the inner end of the male joint member 22 of one of the adjacent oval concrete pipes 14. When so disposed the engagement therebetween prevents the seal gasket 10 from slipping into the joint or groove 12 between the adjacent oval concrete pipes 14.

The base member 18 comprises a substantially flat compressible element 28 disposed to engage the male joint member 22. As shown, the male joint member 22 may include an off-set recess 30 formed on the inner portion thereof to receive the seal gasket 10.

The plurality of sealing elements 20 comprises an inner and outer compressible sealing elements indicated as 32 and 34 respectively formed on opposite ends of the base member 28 having an intermediate sealing element 36 disposed therebetween. Each of the plurality of compressible sealing elements 32, 34 and 36 comprises a substantially V-shaped configuration cooperatively forming a pair of grooves or channels 38 therebetween to permit operative compression to enhance sealing of the joint 12. In addition, a secondary compressible sealing element 40 maybe formed on the inner surface of the outer end of the base member 28 to further enhance sealing.

The seal gasket 10 comprises a foam formed of discontinuous voids to permit compression of seal gasket 10 rather than merely flex during assembly of adjacent oval concrete pipes 14. This permits reduction of the annulus or joint or separation.

In operation the sealing gasket 10 is placed in operative relation to the off-set recess 30 of one of the adjacent oval concrete pipes with an adhesive on the base 18 such that the annular retainer member 26 engages the inner end of the male joint member 22 of one of the adjacent pipes 14. Then the second adjacent oval concrete pipe 14 is moved in coaxial relationship relative to the first adjacent oval concrete pipe 14 to initially start the formation of the joint 12. The sealing elements 32, 34 and 36 are lubricated. As the two adjacent oval concrete pipes 14 are moved inwardly or together relative to each other, the compressible sealing elements 32, 34 and 36 sealing elements are compressed as best shown in FIG. 2 to form a seal of joint 12. The lubricant also comprises an adhesive to secure the seal gasket 10 within joint 12 between adjacent oval concrete pipes 14. Surface 24 may also include an adhesive and lubricant.

It will thus be seen that the objects set forth above, and those made apparent from the preceding description are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statement of the scope of the invention which as a matter of language, might be said to fall therebetween.

Now that the invention has been described,

What is claimed is:

1. A seal gasket and oval concrete pipe combination wherein a plurality of oval concrete pipes each includes a male and female joint member formed on opposite ends thereof to operatively engage the corresponding joint member formed on the next adjacent oval concrete pipe wherein the male joint member includes an off-set recess of reduced diameter on the outer end thereof to receive said seal gasket; said seal gasket comprising a compressible member including a compressible frustro-conically shaped ring disposed to seat within said off-set recess of said male joint member having an inner compressible sealing element and a tapered outer compressible sealing element disposed in axially spaced relation relative to each other extending outwardly from the outer surface of said compressible frustro-conically shaped ring, the length of said inner compressible sealing element being less than the axially spacing between said inner compressible sealing element and said tapered outer compressible sealing element such that said inner compressible sealing element forms a seal between said compressible frustro-conically shaped ring and said female joint member and said tapered outer compressible sealing element forms a seal between said male and female joint members outwardly of said off-set recess, when adjacent oval concrete pipes are placed in operatively relationship relative to each other.

2. The seal gasket of claim 1 further including an intermediate compressible sealing element disposed between said inner and outer compressible sealing elements.

* * * * *